UNITED STATES PATENT OFFICE.

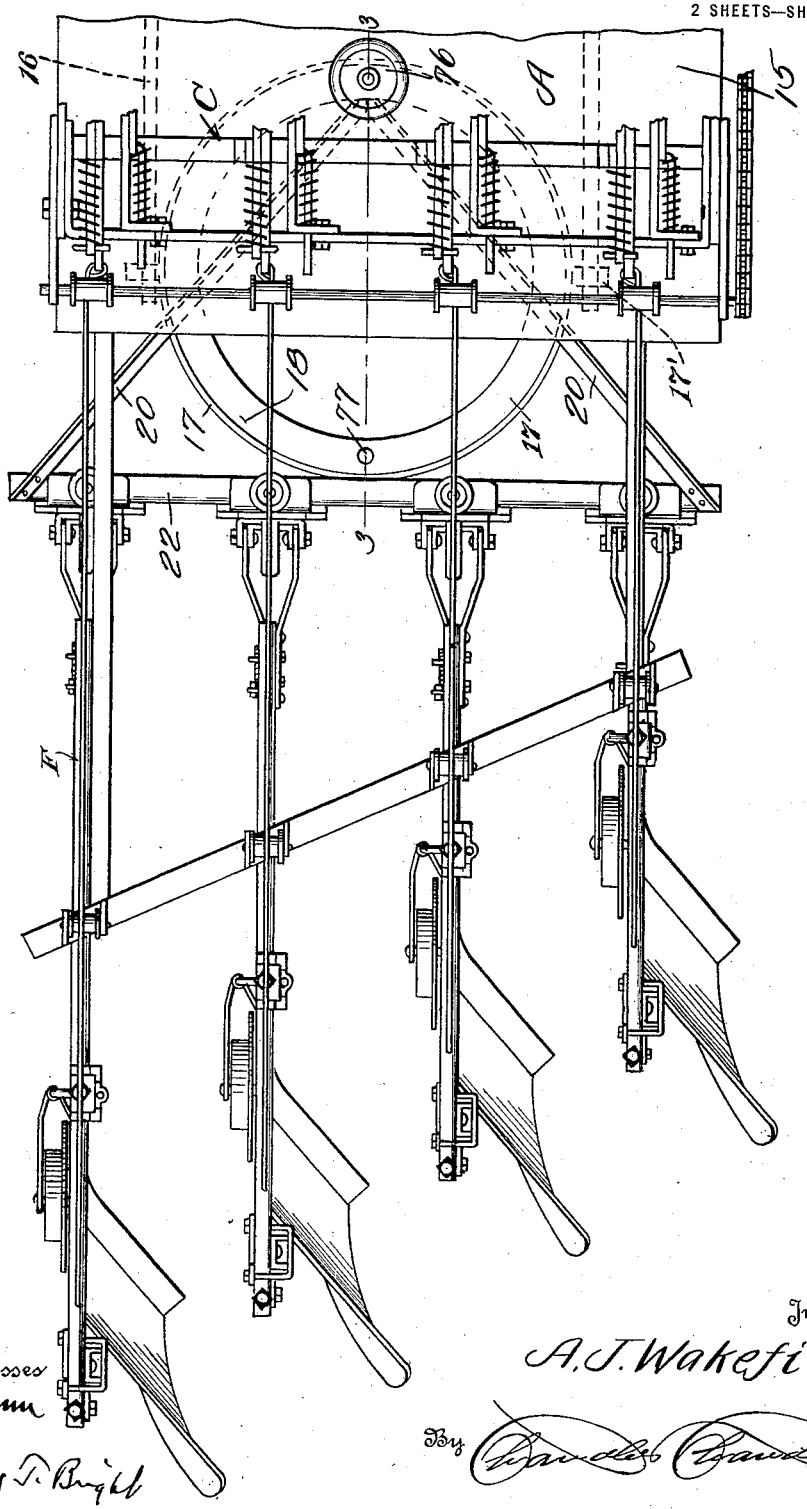

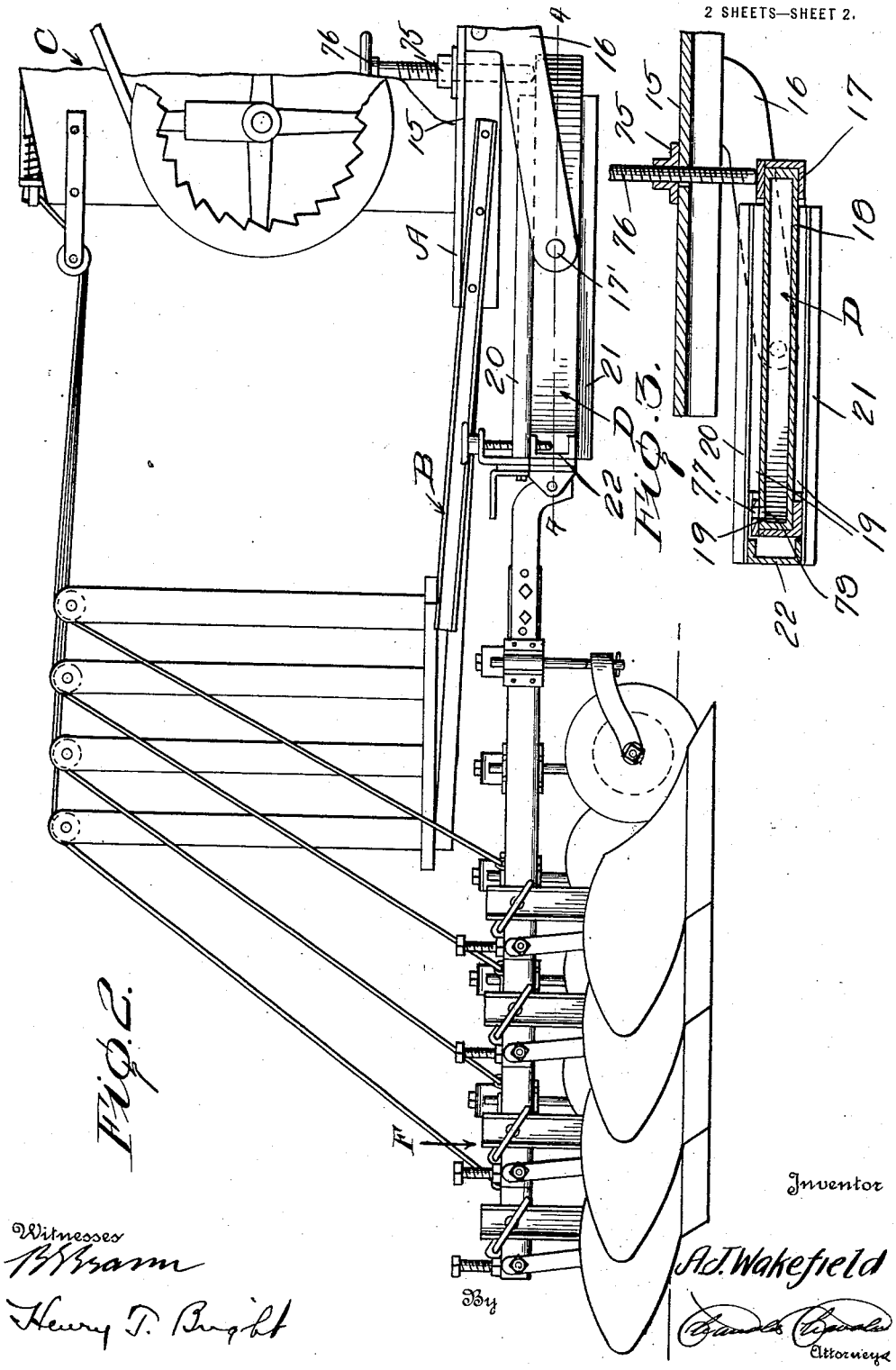

ALMOND J. WAKEFIELD, OF FAULKTON, SOUTH DAKOTA.

GANG-PLOW.

1,172,082.  Specification of Letters Patent.  Patented Feb. 15, 1916.

Application filed April 22, 1914.  Serial No. 833,726.

*To all whom it may concern:*

Be it known that I, ALMOND J. WAKEFIELD, a citizen of the United States, residing at Faulkton, in the county of Faulk, State of South Dakota, have invented certain new and useful Improvements in Gang-Plows; and I do hereby declare the following to be a full, clear, and exact description of the invention, such as will enable others skilled in the art to which it appertains to make and use the same.

This invention relates to gang plows.

The object of the invention resides in the production of a plow structure especially adapted for use with traction engines and connected with the latter in such manner that the plow structure can be turned around in the smallest space required to turn the traction engine drawing the structure.

A further object of the invention resides in the production of a plow structure embodying a plurality of plows connected together for simultaneous bodily movement and in turn connected to a traction engine in such manner as to permit of vertical and horizontal movement of the plows independent of the frame of the traction engine whereby the plows will operate efficiently irrespective of the inequalities of the ground, and whereby the frame of the traction engine will be relieved of all strains other than the pulling stress.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of the invention showing same connected with a traction engine and only the rear portion of the frame of the engine being disclosed; Fig. 2, a side elevation of what is shown in Fig. 1; Fig. 3, a section on the line 3—3 of Fig. 1.

Referring to the drawings A indicates the rear portion of the frame of a traction engine upon which is supported a platform 15. Extending rearwardly from the frame A in upward inclination is a frame B and supported upon the platform 15 and frame B is a plow lifting and lowering mechanism C of the type described and claimed in my U. S. application for patent filed May 14, 1913, and serially numbered 767596. Extending downwardly and rearwardly from each side of the frame A is a bracket 16 and journaled in these brackets are the trunnions 17 of a turn table D. This turn table D comprises an outer cylindrical member 17 and an inner cylindrical member 18 rotatable within the member 17. The top and bottom of the member 17 are provided respectively with openings 19 whereby the top and bottom of the member 18 is exposed. Secured to the top of the member 18 are rearwardly diverging arms 20, while rearwardly diverging arms 21 are secured to the bottom of the member 18. The rear ends of the arms 20 and 21 are connected to a bar 22 which latter serves to mutually connect the forward ends of the beams of a plow gang indicated generally at F.

Threaded in a lug 75 mounted on the platform 15 and extending through said platform is a vertical adjusting screw 76 the lower end of which engages the forward end of the turn table D and serves to limit the upward movement of the forward end of the turn table as will be obvious. By operating the screw 76 downwardly it will be apparent that the bar 22 will be elevated which will in turn elevate all of the beams 23 of the gang at the forward ends of said beams. It will be further apparent that owing to the rotatable mounting of the member 18 within the member 17 that the traction engine including the frame A can be turned in a short space which operation could not be effected in the absence of the pivotal connection between the gang and traction engine. By pivotally mounting the turn table D on the brackets 16 it will be obvious that the plows of the gang can readily respond to inequalities of the ground.

In order to provide means for locking member 18 against rotation in the member 17 to maintain the plow gang in longitudinal alinement with the traction engine at all times there is provided in the members 17 and 18 openings 77 and 78 respectively through which is adapted to be inserted when said openings are in registration a suitable locking pin.

What is claimed is:—

1. The combination with a tractor, of a ring member pivotally mounted upon the tractor for movement in a vertical plane, a second member rotatably mounted within the ring member, arms secured to the second member, a bar connecting corresponding ends of said arms, and a plurality of plows connected to said bar.

2. The combination with a tractor, of a ring member having opposite disposed trunnions pivotally engaged with the tractor whereby said ring member is mounted to swing in a vertical plane, a second member rotatably mounted within the ring member, arms secured to the second member, a bar connecting corresponding ends of said arms, and a plurality of plows connected to said bar.

In testimony whereof, I affix my signature in the presence of two witnesses.

ALMOND J. WAKEFIELD.

Witnesses:
THEO. D. McFORGE,
WILL LEE KNOOD.

Copies of this patent may be obtained for five cents each, by addressing the "Commissioner of Patents, Washington, D. C."